(12) United States Patent
Tuomi et al.

(10) Patent No.: US 11,551,398 B2
(45) Date of Patent: Jan. 10, 2023

(54) LIGHT VOLUME RENDERING

(71) Applicants: Advanced Micro Devices, Inc., Santa Clara, CA (US); ATI Technologies ULC, Markham (CA)

(72) Inventors: Mika Tuomi, Santa Clara, CA (US); Miikka Petteri Kangasluoma, Santa Clara, CA (US); Jan Henrik Achrenius, Santa Clara, CA (US); Laurent Lefebvre, Markham (CA)

(73) Assignees: Advanced Micro Devices, Inc., Santa Clara, CA (US); ATI Technologies ULC, Markham (CA)

(*) Notice: Subject to any disclaimer, the term of this patent is extended or adjusted under 35 U.S.C. 154(b) by 0 days.

(21) Appl. No.: 17/008,388

(22) Filed: Aug. 31, 2020

(65) Prior Publication Data

US 2021/0150797 A1 May 20, 2021

Related U.S. Application Data

(60) Provisional application No. 62/936,135, filed on Nov. 15, 2019.

(51) Int. Cl.
*G06T 15/00* (2011.01)
*G06T 15/40* (2011.01)
(Continued)

(52) U.S. Cl.
CPC ............. *G06T 15/005* (2013.01); *G06T 1/20* (2013.01); *G06T 7/0002* (2013.01);
(Continued)

(58) Field of Classification Search
CPC ....... G06T 15/005; G06T 15/405; G06T 15/80; G06T 1/20; G06T 7/0002; G06T 17/10
See application file for complete search history.

(56) References Cited

U.S. PATENT DOCUMENTS 5,729,672 A 3/1998 Ashton
9,189,883 B1 11/2015 Hecht
(Continued)

OTHER PUBLICATIONS

International Search Report and Written Opinion in International Application No. PCT/US2020/060490, dated Feb. 23, 2021, 17 pages.
(Continued)

*Primary Examiner* — Michelle Chin
(74) *Attorney, Agent, or Firm* — Kowert Hood Munyon Rankin and Goetzel PC; Rory D. Rankin

(57) ABSTRACT

Systems, apparatuses, and methods for implementing light volume rendering techniques are disclosed. A processor is coupled to a memory. A processor renders the geometry of a scene into a geometry buffer. For a given light source in the scene, the processor initiates two shader pipeline passes to determine which pixels in the geometry buffer to light. On the first pass, the processor renders a front-side of a light volume corresponding to the light source. Any pixels of the geometry buffer which are in front of the front-side of the light volume are marked as pixels to be discarded. Then, during the second pass, only those pixels which were not marked to be discarded are sent to the pixel shader. This approach helps to reduce the overhead involved in applying a lighting effect to the scene by reducing the amount of work performed by the pixel shader.

20 Claims, 10 Drawing Sheets

(51) Int. Cl.
*G06T 15/80* (2011.01)
*G06T 17/10* (2006.01)
*G06T 7/00* (2017.01)
*G06T 1/20* (2006.01)

(52) U.S. Cl.
CPC ............ *G06T 15/405* (2013.01); *G06T 15/80* (2013.01); *G06T 17/10* (2013.01)

(56) References Cited

U.S. PATENT DOCUMENTS

| | | | |
|---|---|---|---|
| 10,636,201 B2 | 4/2020 | Mitchell et al. | |
| 10,665,010 B2 | 5/2020 | Hazel | |
| 10,679,405 B2 | 6/2020 | Fursund et al. | |
| 10,692,270 B2 | 6/2020 | Stanard et al. | |
| 10,789,675 B2 | 9/2020 | Pohl | |
| 2009/0147017 A1* | 6/2009 | Jiao | G06T 15/04 345/582 |
| 2017/0365090 A1* | 12/2017 | Hazel | G06T 15/40 |

OTHER PUBLICATIONS

"General OpenGL—Per-Sample Processing—Scissor Test—Stencil Test—Depth Test—Eady Fragment Test", Apr. 22, 2019, 31 pages, https://web.archive.org/web/20200930182637/https://www.khronos.org/opengl/wiki/General_OpenGL. [Retrieved Feb. 11, 2021].

Klehm, Oliver, "Interactive Massive Lighting for Virtual 3D City Models", Master's Thesis, Oct. 30, 2010, 85 pages, https://people.mpi-inf.mpg.de/~oklehm/publications/2010/master/massive_lighting_klehm10.pdf. [Retrieved Feb. 29, 2016].

Zhu et al., "Real-Time Rendering Framework in the Virtual Home Design System", Transactions on Edutainment IX, Jan. 2013, pp. 213-224.

Crow, "Shadow Algorithms for Computer Graphics", pp. 242-248, Siggraph '77, Jul. 20-22 San Jose, California.

Kolivand, et al., "Real-Time Shadow Using a Combination of Stencil and the Z-Buffer", The International Journal of Multimedia & Its Applications, vol. 3, No. 3, Aug. 2011.

\* cited by examiner

LIGHT VOLUME RENDERING

CROSS REFERENCE TO RELATED APPLICATIONS

This application claims priority to Provisional Patent Application Ser. No. 62/936,135, entitled "Light Cone Rendering", filed Nov. 15, 2019, the entirety of which is incorporated herein by reference.

BACKGROUND

Description of the Related Art

Graphics processors are often used within computer graphics processing systems to create computer-generated imagery from a geometric model. A geometric model defines various objects, details, lighting sources, and other elements of a virtual scene. The computing system determines how to render a given scene based on the geometric model and other inputs from a software application. These inputs include graphical objects such as points, lines, polygons, three dimensional solid objects, and other objects. These objects can be referred to more generally as "primitives".

A graphics processing unit (GPU) or other type of processor processes the inputs and the geometric model to generate a two or three dimensional array of pixel color values that represent the desired image or video frame. Each pixel of a frame has multiple attributes associated with it, including a color and a texture. A shader is used to perform arithmetic and logical operations on the attributes of each pixel to achieve a final value that represents the pixel. The final value is placed into a frame buffer and is used when the pixel is driven to a display device. When a light source is present in a virtual scene being rendered, a lighting effect is applied to pixels which are being illuminated by the light source. Determining which pixels should be illuminated and which pixels should not be illuminated can be challenging. Many of the existing approaches to deal with this challenge use a significant amount of central processing unit (CPU) cycles, GPU bandwidth, and/or are coarse in their initial pixel filtering (i.e., they select too many pixels).

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing light volume rendering techniques are disclosed herein. A processor executes an application to render a virtual scene. The processor renders geometry of the virtual scene and generates and stores a plurality of pixels in a geometry buffer. The plurality of pixels of the geometry buffer are generated without taking into account any light sources. The geometry buffer includes a depth value for every pixel on the screen. Next, the processor renders a light volume for each light source within the virtual scene. Then, the processor performs a first pass through the geometry buffer to determine which pixels of the scene geometry are in front of a front-side of a given light volume. These scene geometry pixels that are in front of the front-side of the given light volume are recorded and discarded when performing a second pass through the geometry buffer. The second pass is performed to determine which scene geometry pixels are behind the back-side of the light volume. The remaining scene geometry pixels are those pixels which fall within the light volume. A lighting effect is applied to pixels falling within the light volume, and then the pixel shader shades pixels to represent the virtual scene. The pixels can then be provided to a display controller to be driven to a display. This process can be repeated for each light source in the scene for each frame of a video game, movie, or other application.

Figure 1:
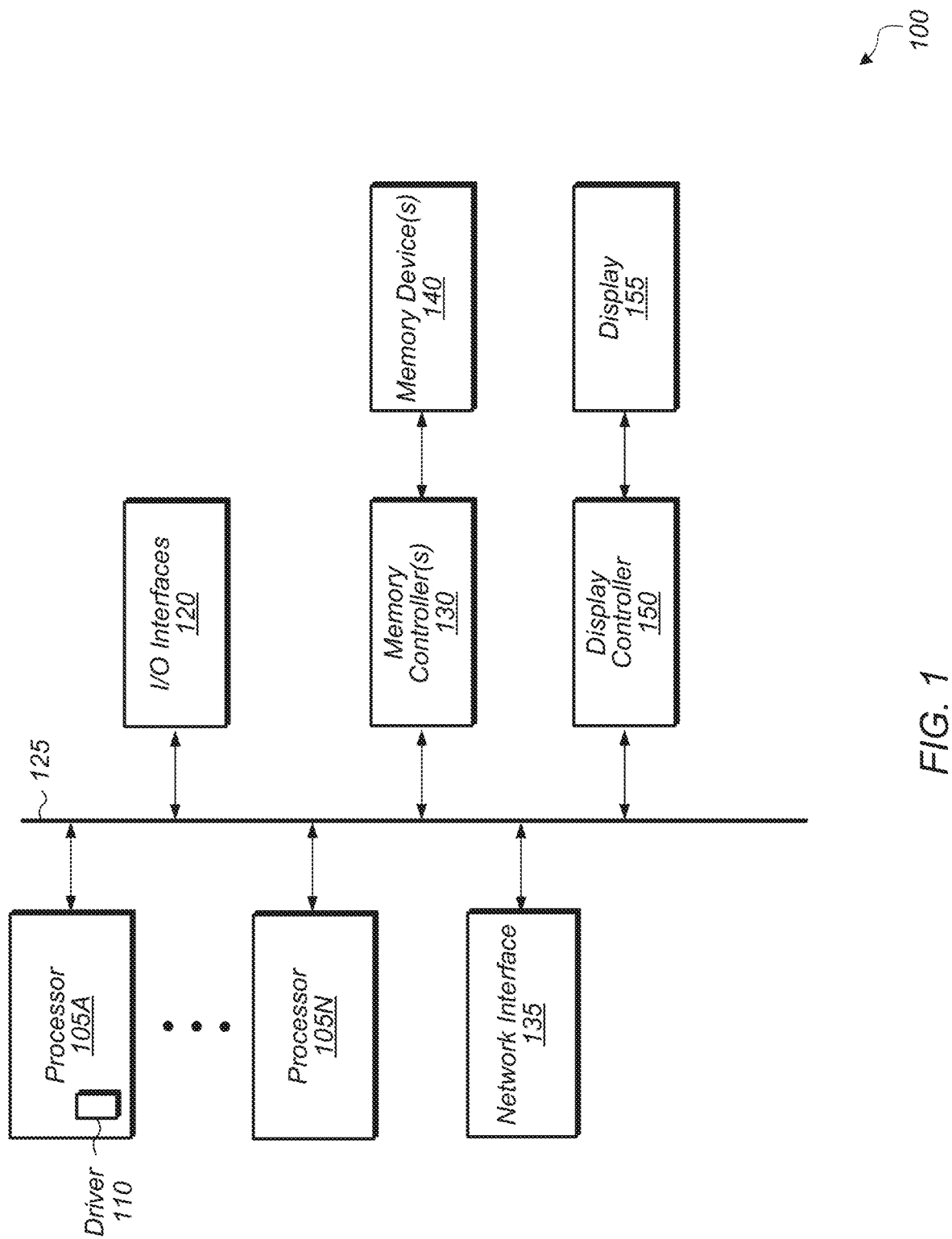
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
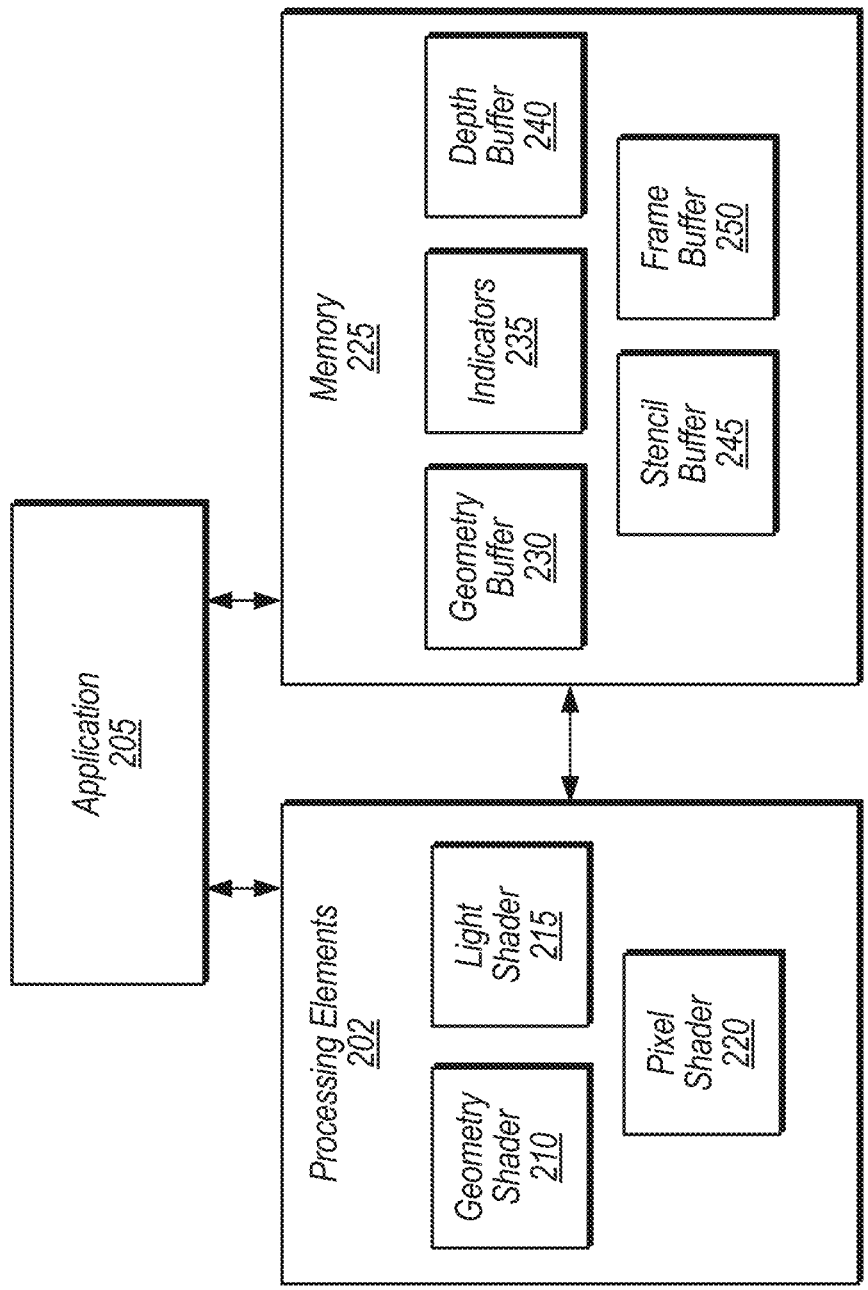
FIG. 2 is a logical block diagram of another implementation of a system for rendering graphics.

Turning now to FIG. 2, a logical block diagram of one implementation of a system 200 for rendering graphics is shown. In one implementation, system 200 includes components such as processing elements 202, application 205, and memory 225. Processing elements 202 include at least geometry shader 210, light shader 215, pixel shader 220, and any number of other shaders (not shown). Processing elements 202 include one or more CPUs, GPUs, FPGAs, ASICs, DSPs, and/or other processing resources. It is noted that system 200 can also include any number and type of other components, with the other components varying from implementation to implementation. In one implementation, application 205 is a graphics application for rendering pixels to represent scenes of a video game, movie, or other application. In one implementation, application 205 includes program instructions which are stored in memory 225 and which execute on processing elements 202. Application 205 can run on a general-purpose processor or fixed hardware such as a FPGA or ASIC. Similarly, geometry shader 210, light shader 215, and pixel shader 220 can be implemented using any suitable combination of software and/or hardware.

In various implementations, geometry shader 210 generates depth values for the scene geometry of a given scene projected onto a projection plane. Light shader 215 applies a lighting effect to pixels illuminated by a light source while pixel shader 220 generates the color and additional appearance attributes that are to be applied to each pixel of a rendered object. Alternatively, a single unified shader could be employed that is able to implement the functionality of geometry shader 210, light shader 215, and pixel shader 220.

In one implementation, working from the geometry buffer 230, for each scene being rendered, application 205 begins by causing the geometry of the scene to be rendered into pixels with depth information. The output of the geometry rendering step is stored in geometry buffer 230. Next, application 205 causes light volumes to be generated for the light sources of the scene. Then, for each light volume, system 200 determines which pixels in the geometry buffer 230 are in front of the front-side of the light volume. In one implementation, system 200 maintains a first pass discard indicator for each pixel to indicate whether the pixel is in front of the front-side of the light volume or behind the front-side of the light volume. System 200 can maintain a separate first pass discard indicator per pixel for each light volume, or system 200 can maintain a single first pass discard indicator per pixel for all of the light volumes corresponding to all light sources of the scene.

In one implementation, first pass discard indicators 235 are stored in memory 225. In another implementation, first pass discard indicators 235 are stored in a cache within a processing unit of processing elements 202. In one implementation, system 200 uses depth buffer 240 to compare the depth of pixels in each primitive to the depth of the front-side of the light volume. In another implementation, system 200 uses stencil buffer 245 to record which pixels of primitives are in front of the front-side of the light volume. In other implementations, system 200 uses other techniques to determine and/or record which pixels from primitives are in front of the front-side of the light volume.

In one implementation, after the first pass, system 200 launches a second pass only for those pixels which were determined to be behind the front-side of the light volume. The second pass is not performed for pixels that were determined to be in front of the front-side of the light volume. This helps to reduce the amount of work performed during the second pass. In one implementation, if there are multiple light sources and it is desired to treat the light sources as a group, then system 200 launches the second pass for pixels which are behind at least one front-side of one light volume. In other words, in this implementation, system 200 discards pixels which are in front of the front-sides of all of the light volumes corresponding to all of the light sources of the scene. Alternatively, each source can be treated independently and in series. The second pass is launched on light shader 215 and pixel shader 220 to determine which pixels are within the light volume(s), apply a lighting effect to pixels within the light volume(s), and to shade the pixels of the scene. During the second pass, pixels which are behind the back-side of the light volume(s) are discarded before light shader 215 applies the lighting effect. Once all pixels have been shaded and the pixels within the light volume(s) have been lit, the pixels are written to frame buffer 250. The pixels in frame buffer 250 can then be driven to a display (e.g., display 155 of FIG. 1).

Figure 3:
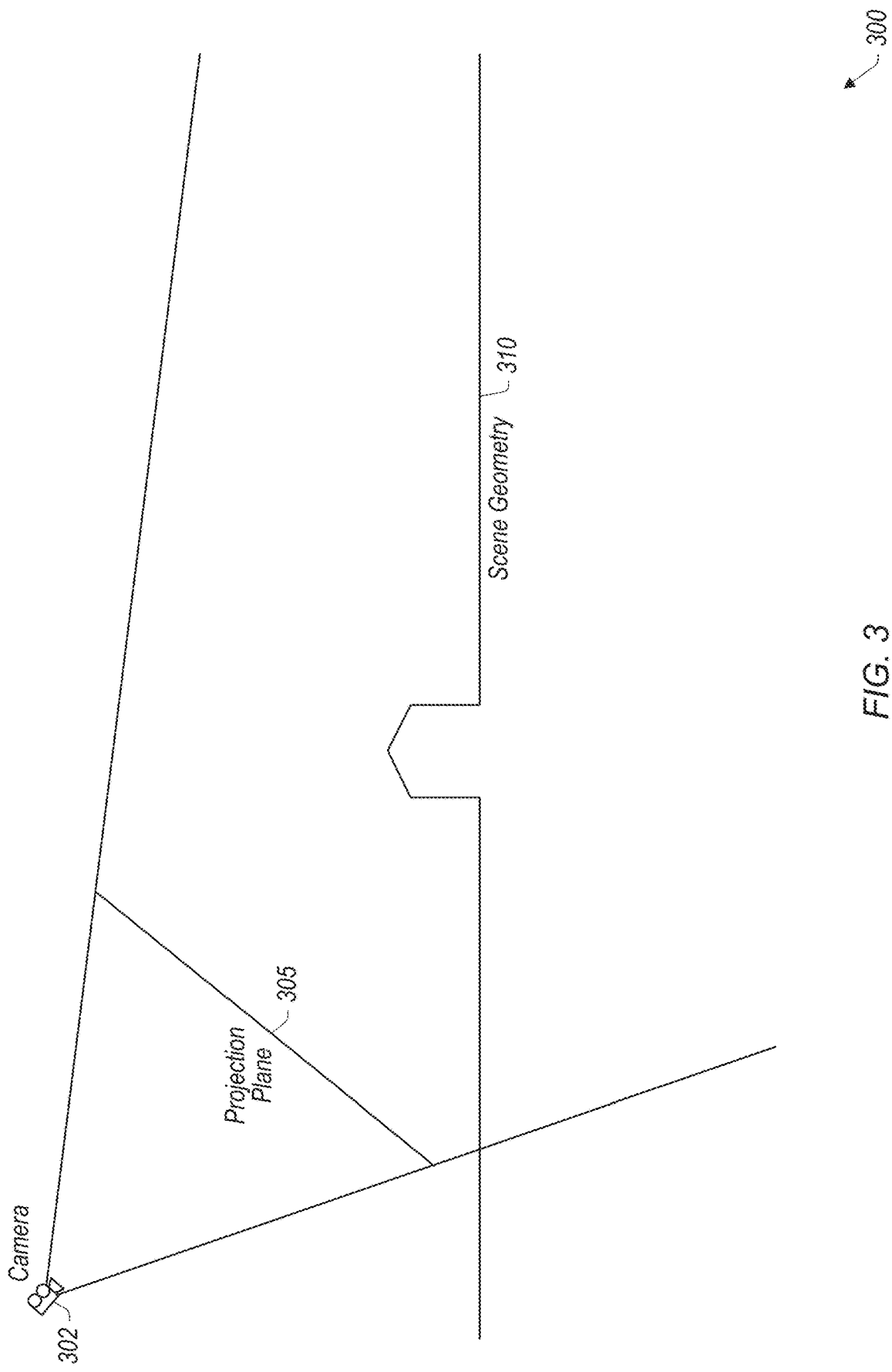
FIG. 3 is a diagram of one implementation of an example of a scene being rendered by an application.

Referring now to FIG. 3, a diagram of one example of a scene 300 being rendered by an application is shown. In one implementation, scene 300 is being rendered by application 205 of system 200 (of FIG. 2). In one implementation, when an application renders scene 300 from the point of view of camera 302, the application projects the geometry onto projection plane 305, and the application uses culling to hide the hidden geometry. This is the generic technique for performing three-dimensional (3D) rendering of scenes using a perspective projection. Other projection types, such as orthogonal projections are also supported. It should be understood that projection plane 310 represents a two-dimensional grid of pixels even though it is shown as a one-dimensional line in FIG. 3.

In one implementation, the scene geometry 310 is rendered and then the output is stored in a geometry buffer (e.g., geometry buffer 230 of FIG. 2). As shown in scene 300, scene geometry 310 includes the ground and then a house-type structure in the middle of the diagram. It should be understood that scene 300 is intended to serve as an example of a scene that could be rendered by a given application. Other scenes with more objects and more complexity can be rendered in other implementations.

Figure 4:
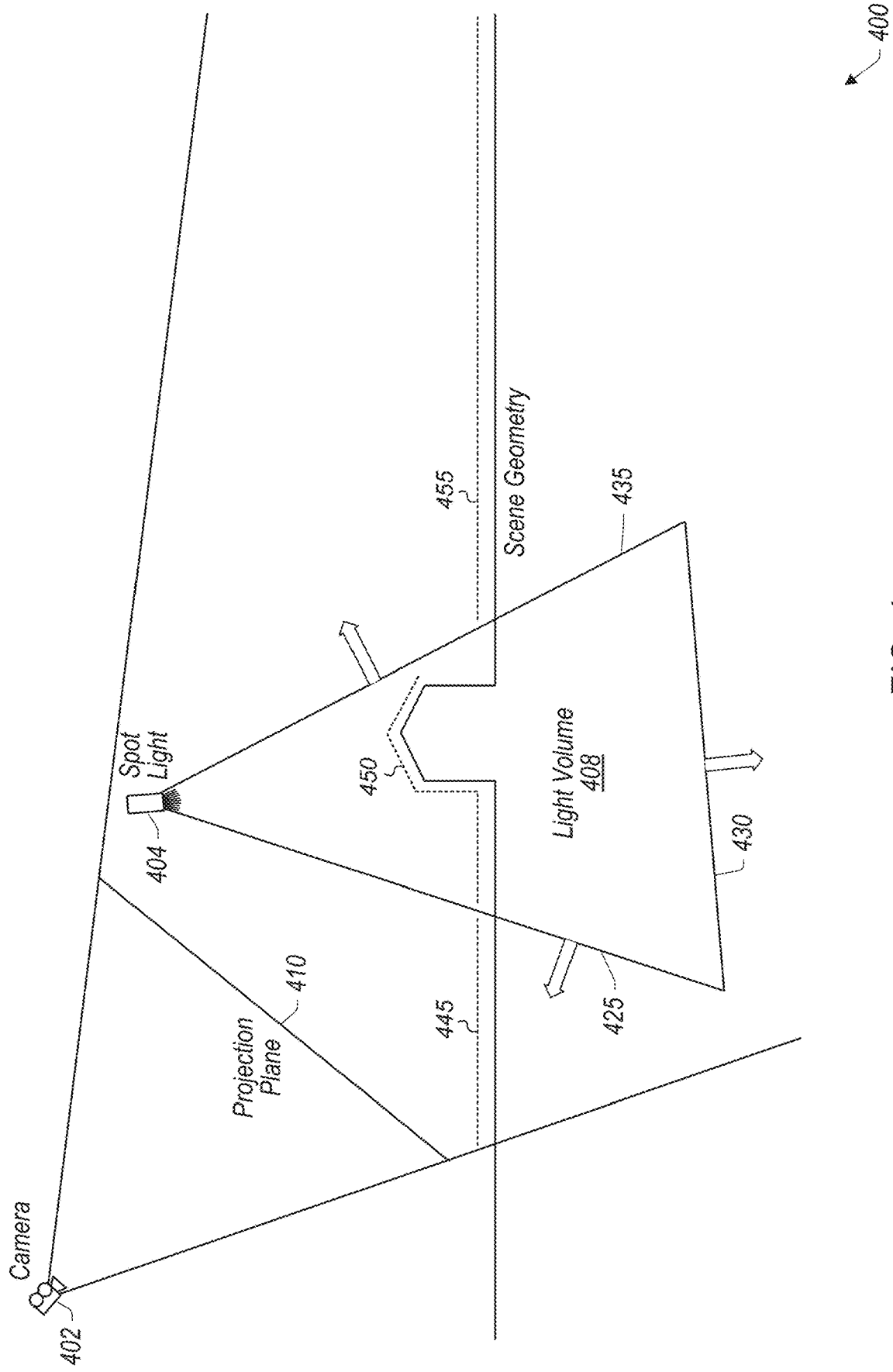
FIG. 4 is a diagram of one example of a scene being rendered by an application.

Turning now to FIG. 4, a diagram of one example of a scene 400 being rendered by an application is shown. It is noted that the discussion of FIG. 4 is intended to be a continuation of the discussion of FIG. 3. Scene 400 depicted in FIG. 4 includes scene geometry which is equivalent to the scene geometry 310 of scene 300 of FIG. 3. The scene geometry of scene 400 is highlighted by the dashed line portions 445, 450, and 455 above the solid lines of the actual scene geometry. However, one difference between scene 300 and scene 400 is that a light source (i.e., spot light 404) has been added to scene 400 which illuminates a portion of the scene geometry.

Whenever a light source is present in a given scene, an application could attempt to apply a lighting effect corresponding to the light source. Prior to applying a lighting effect, the application typically renders the geometry of scene 400 while ignoring light source 404. The result of this rendering of the geometry is stored in a geometry buffer (e.g., geometry buffer 230 of FIG. 2). After generating the pixel values in the geometry buffer, the application will apply a lighting effect to the pixel values. To apply a lighting effect, the application identifies the pixels that are being illuminated by the light source. To identify these pixels, the application generates a light volume as a first step in determining which pixels should be illuminated by the light source when rendering the scene.

In the example depicted in scene 400 of FIG. 4, the application generates light volume 408 for light source 404. In one implementation, after generating light volume 408, the application tries to identify all of the pixels of the scene geometry that are inside of light volume 408. While light volume 408 is shown as a cone in FIG. 4, it should be understood that this is merely one type of shape that can be used to represent a light volume. In another implementation, a sphere is generated to represent a light volume. In other implementations, other shapes can be generated to represent a light volume for a given light source.

In the implementation depicted in FIG. 4, light volume 408 has three faces 425, 430, and 435. Face 425 is a front-side of light volume 408 since the normal of face 425 points toward projection plane 410. This is indicated by the arrow drawn out of face 425. It is noted that face 425 can also be referred to as a "front-facing primitive". While light volume 408 has a single front-side 425 in this example, it should be understood that light volumes can have multiple front-sides (i.e., front-facing primitives) in other implementations. Faces 430 and 435 are back-sides of light volume 408 since the normals of faces 430 and 435 point away from projection plane 410 as indicated by the arrows shown coming out of faces 430 and 435. Faces 430 and 435 can also be referred to as "back-facing primitives". In other implementations, a light volume can have other numbers of back-side faces (i.e., back-facing primitives).

A traditional implementation for determining which pixels of the scene geometry are potentially illuminated by light source 404 would render the back-side of light volume 408. After rendering the back-side of light volume 408, the application projects the back-side onto projection plane 410 to identify all of the pixels that are potentially affected by the light. Only those sections which are in front of faces 430 and 435 would be passed onto the light shader and/or pixel shader. In this example, sections 445 and 450 are in front of faces 430 and 435, so these would be passed onto the light shader and/or pixel shader. Section 455 is behind face 435, so section 455 would be culled in this example. In one implementation, a depth buffer (or Z buffer) test is performed to determine whether sections of the scene geometry are in front of or behind the back-side of a light volume. A drawback of the above approach is that the pixels of section 445 would be sent to the light shader and/or pixel shader, causing unnecessary work to be performed. This results in a relatively large number of pixels being sent to the pixel shader, with many of these pixels ending up not being run through the lighting pass. For this approach, the pixel shader will end up performing a lot of extra work to discard pixels that are not needed before lighting pixels that are actually needed. An improved technique that addresses this inefficient usage of the pixel shader will be described in the discussion which follows for FIG. 5.

Figure 5:
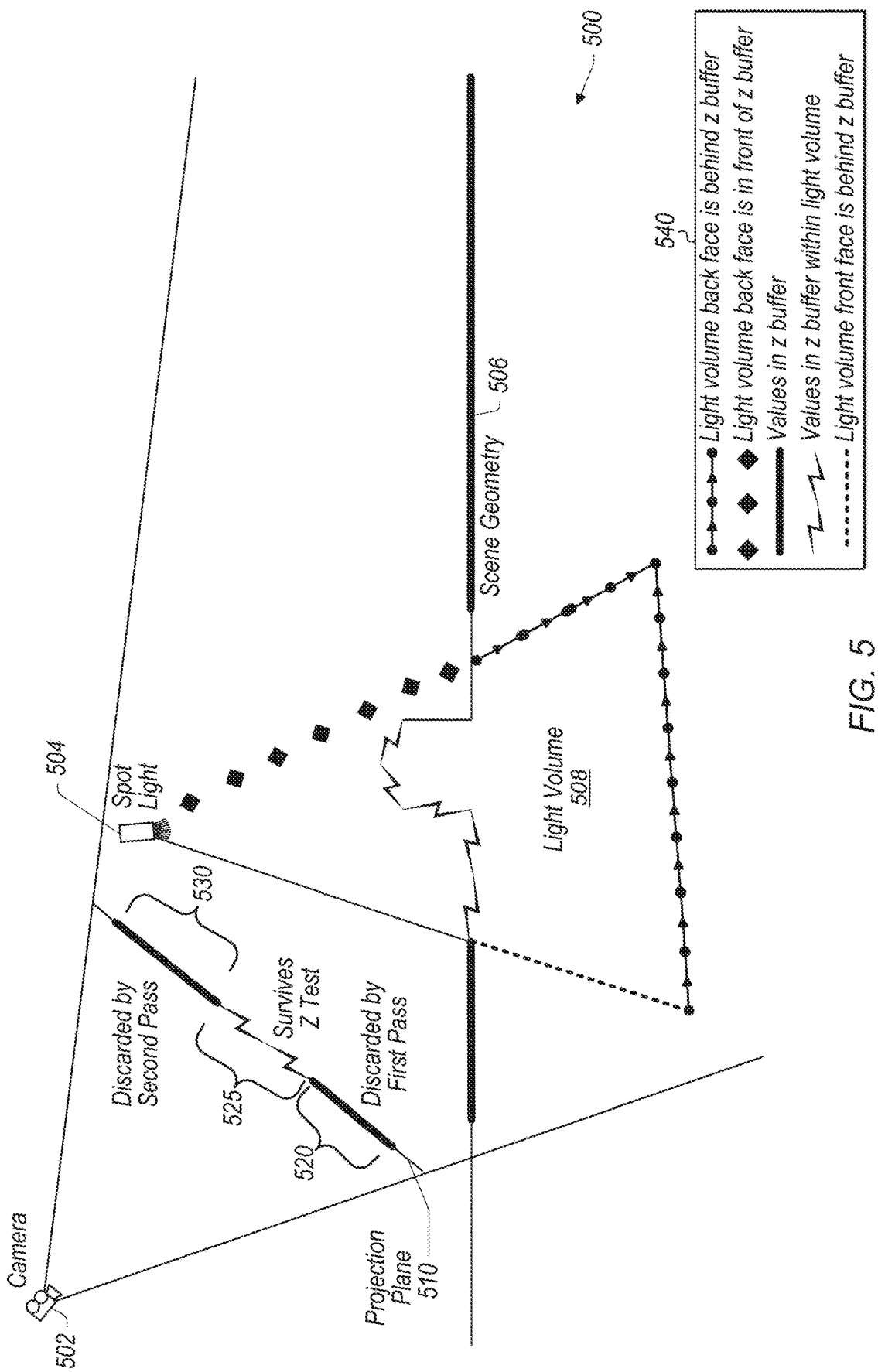
FIG. 5 is a diagram of a scene being rendered in accordance with one implementation.

Referring now to FIG. 5, one implementation of a scene 500 being rendered is shown. It is noted that the discussion of FIG. 5 is a continuation of the discussion of FIG. 4. Accordingly, scene 500 is intended to represent scene 400 (of FIG. 4) but with additional elements of scene 500 labeled as compared to scene 400 with the purpose of illustrating various light volume rendering techniques. The line types illustrated for the various portions of scene 500 are defined by legend 540. In one implementation, techniques are employed to reduce the overhead associated with the traditional approaches. In this implementation, instead of just rendering the back-side of light volume 508, a first pass is performed for the front-side of light volume 508 and then a second pass is performed for the back-side of light volume 508. For a tile-based application, two passes are performed for every tile of the screen. As used herein, a "tile" is defined as a block of pixels of a frame being rendered. The block can be any size (e.g., 8×8 pixels, 16×16 pixels), with the size varying according to the implementation.

On the first pass, the front-side of light volume 508 is rendered. When rendering the front-side of light volume 508, depth buffer writes and color buffer writes are disabled so that the depth buffer and color buffer will not be changed by light volume 508. During the first pass, the front-face of light volume 508 is projected onto projected plane 510. When the corresponding portion of the scene geometry 506 is projected onto the projection plane 510, a depth buffer test will indicate that the ground which is to the left of light volume 508 is actually hiding that section of the front-face of light volume 508. This means that this left-most portion of the scene geometry 506 is in front of the light volume 508. Accordingly, the pixels of scene geometry 506 which correspond to section 520 of projection plane 510 are discarded since they are all in front of the front face of the light volume 508. In one implementation, information is recorded whenever a portion of the front-side of a light volume 508 is hidden by the scene geometry 506. In one implementation, determining when any portion of the front-side of a light volume 508 is hidden is achieved by performing a depth test (or Z-test) in the depth buffer (e.g., depth buffer 240 of FIG. 2). Depending on the implementation, the depth test can use any suitable comparison such as greater than, greater than or equal to, less than, or less than or equal to. Once the application records which sections of the scene geometry are in front of the front-side of the light volume 508, a second pass is performed by rendering the back-side of light volume 508. It is noted the the second pass is not performed for the pixels of scene geometry 506 which are in front of the front-side of the light volume 508. This helps to reduce the amount of work performed during the second pass.

During the second pass, a depth or stencil test is performed to discard the pixels of scene geometry 506 which correspond to section 530 of projection plane 510. These pixels of scene geometry 506 are discarded since these pixels are behind the back-side of light volume 508. The pixels of scene geometry 506 which correspond to section 525 of projection plane 510 survive the second pass since these pixels fall within light volume 508 and should be lit (i.e., run through the light shader). Accordingly, only the geometry buffer pixels corresponding to section 525 of projection plane 510 will be processed by the light shader, leading to a more efficient usage of the processing resources.

Figure 6:
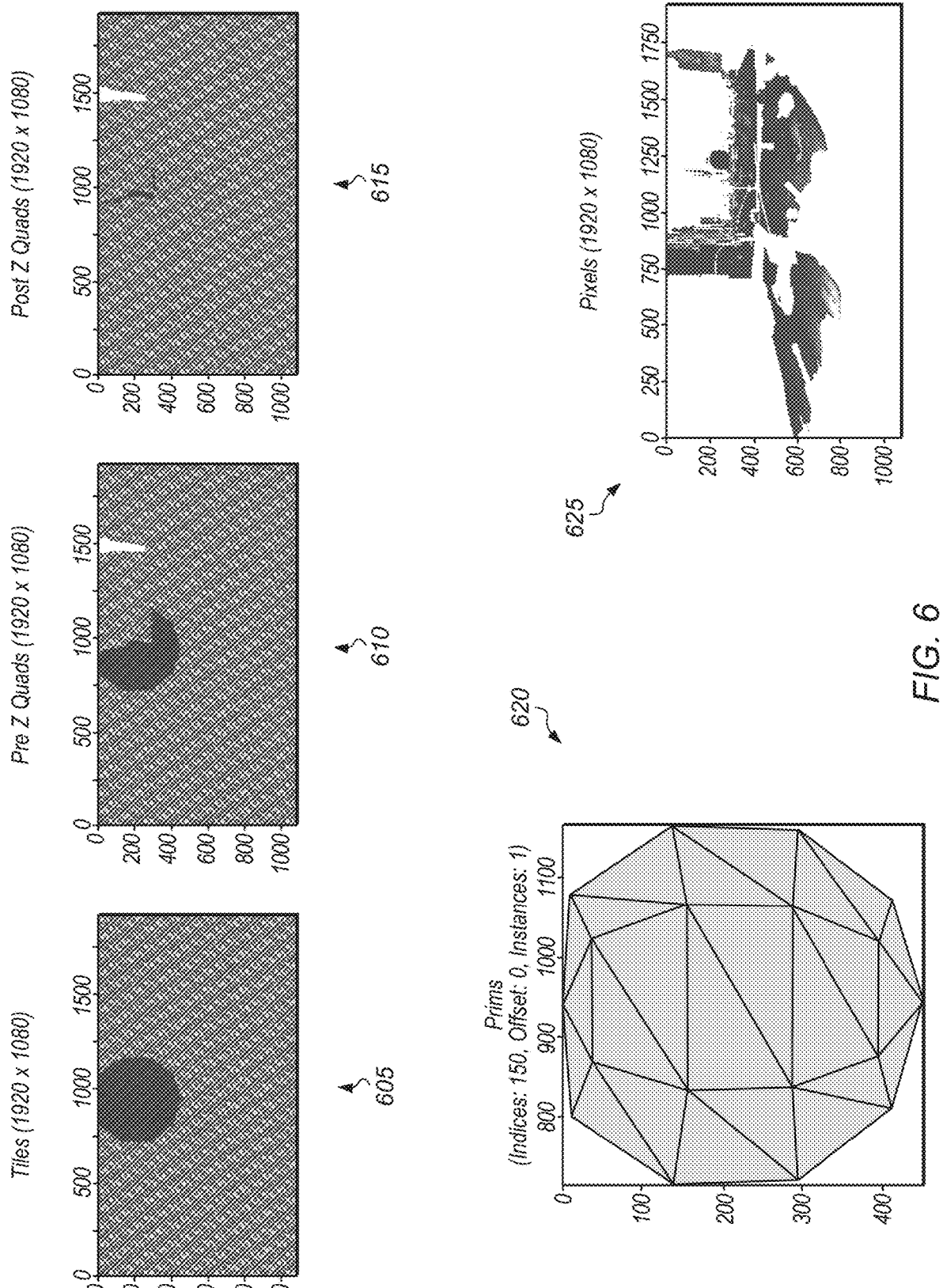
FIG. 6 includes diagrams associated with a scene being rendered.

Turning now to FIG. 6, diagrams associated with a scene being rendered are shown. It is noted that the discussion of FIG. 6 is a continuation of the discussion of FIG. 5. Accordingly, diagrams 605, 610, 615, 620, and 625 are intended to represent different steps within the rendering process associated with scene 500 of FIG. 5. Diagram 605 is a coarse representation of the light volume projected into the scene. The dark portion of diagram 605 reflects the portion of the screen potentially affected by the light volume prior to removing any pixels from the scene geometry. The dark portion of diagram 610 represents the light volume projected into the scene but with pixels omitted for sections that were discarded for being behind the back-side of the light volume. Diagram 615 represents only those pixels that fall within the light volume when projected onto the projection plane. Diagram 620 is a visualization of the light volume that is being projected onto the scene geometry of the scene. Diagram 625 is a representation of all of the lit pixels by all of the light sources of the scene. The visualization of diagrams 605, 610, and 615 illustrates the amount of work that is performed to remove pixels from the light volume to end up with only those pixels of the geometry buffer projected into the projection plane which should be lit.

Figure 7:
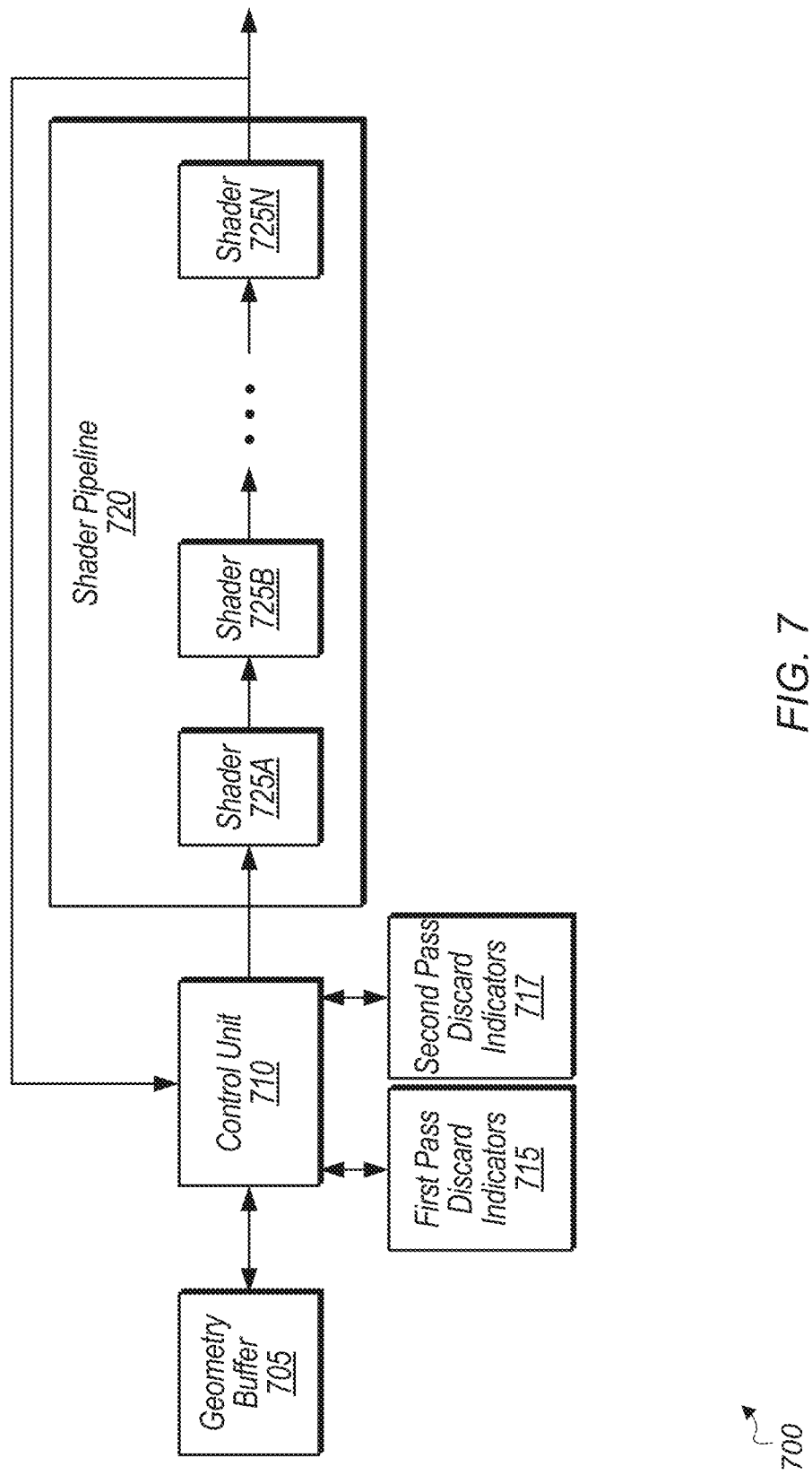
FIG. 7 is a block diagram of one implementation of a computing system.

Referring now to FIG. 7, a block diagram of one implementation of a computing system 700 is shown. In one implementation, computing system 700 includes at least geometry buffer 705, control unit 710, first pass discard indicators 715, second pass discard indicators 717, and shader pipeline 720. Computing system 700 can include any number of other components (e.g., memory device, frame buffer, display) which are not shown to avoid obscuring the figure. In one implementation, control unit 710 causes the pixels of geometry buffer 705 to be processed by shader pipeline 720 in a first pass. During the first pass, the pixels that are in front of any front-facing sides of a light volume are identified, and this information is recorded in first pass discard indicators 715. Control unit 710 can be implemented using any suitable combination of software and/or hardware. It is noted that control unit 710 can also be referred to as control logic 710.

After the first pass, pixels with first pass discard indicators 715 set to a first value (e.g., 1) are discarded. Then, a second pass is performed by the control unit 710 to set the second pass discard indicators 717. Only the surviving pixels from both passes are sent to the shader pipeline 710 for lighting. Shader pipeline 720 includes any number of shader units 725A-N, from 1 to N, where N is a positive integer greater than 1. It is noted that shader units 725A-N can also be referred to as shader stages 725A-N. Shader units 725A-N can include any number and type of shaders such as a vertex shader, a light shader, a pixel shader, a geometry shader, a fragment shader, a compute shader, and so on. In one implementation, the output of the second pass includes a plurality of pixels which are representative of a scene. The output of the second pass can undergo further processing, can be stored, and/or can be driven to a display.

Figure 8:
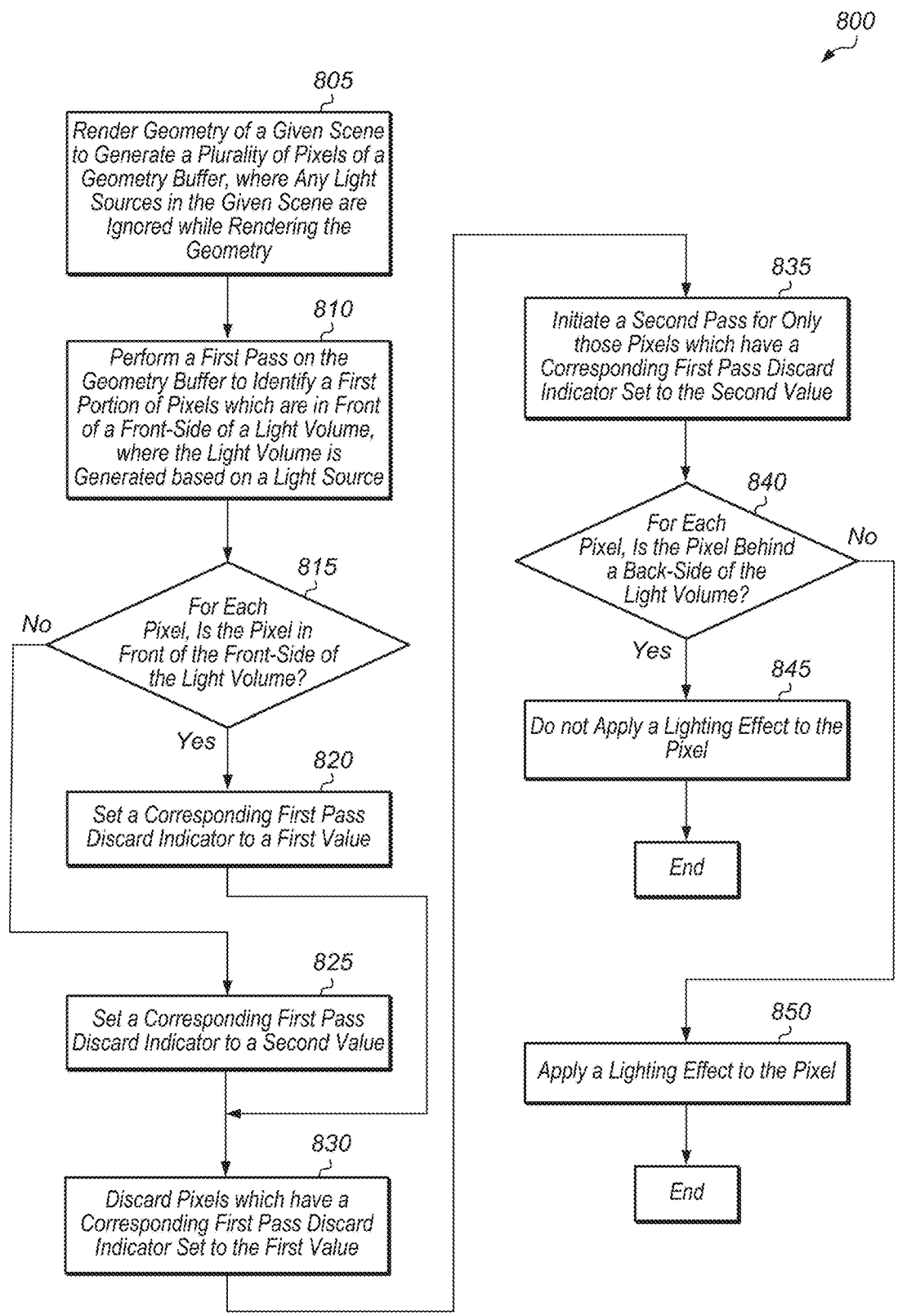
FIG. 8 is a generalized flow diagram illustrating one implementation of a method for performing light volume rendering.
Figure 9:
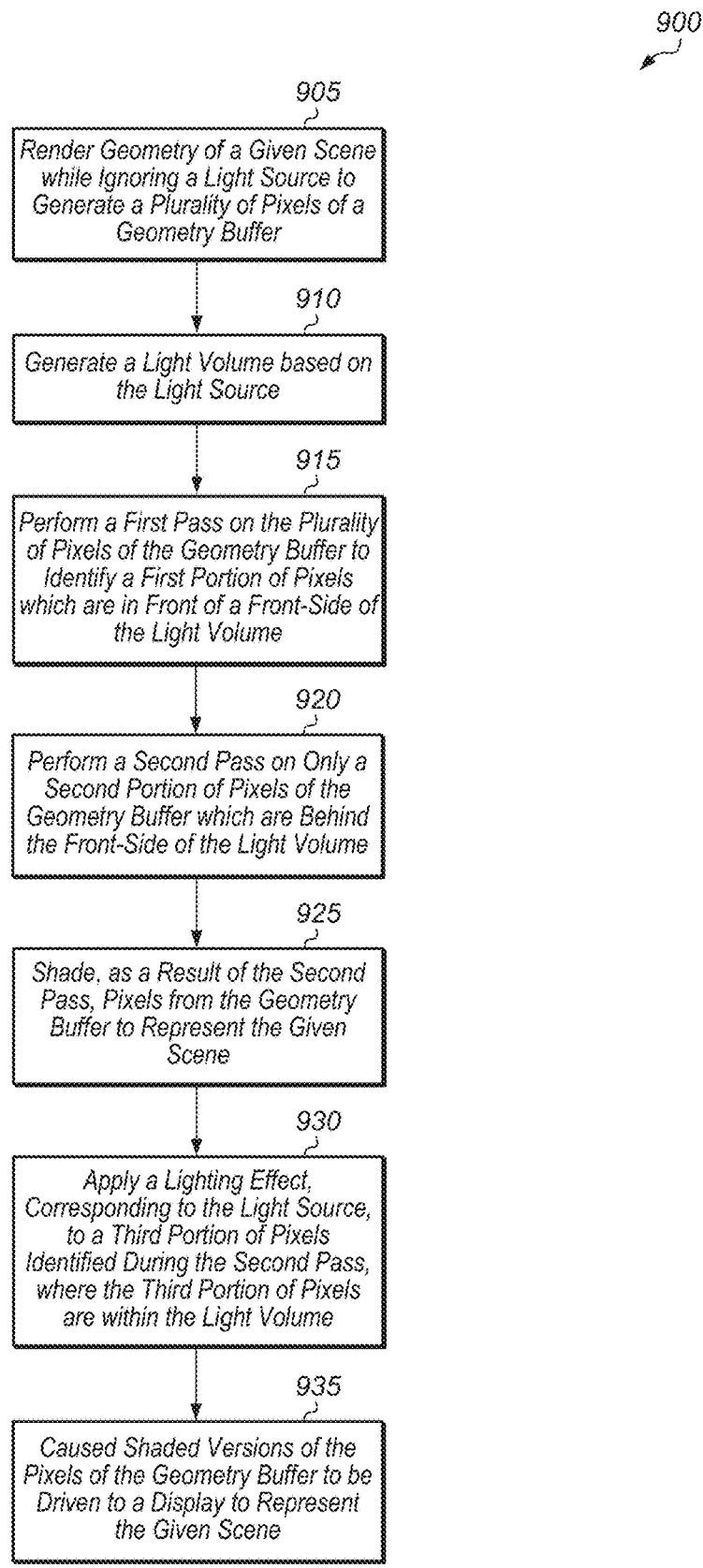
FIG. 9 is a generalized flow diagram illustrating one implementation of a method for performing light volume rendering.

Referring now to FIG. 8, one implementation of a method 800 for performing light volume rendering is shown. For purposes of discussion, the steps in this implementation and those of FIG. 9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800.

An application executing on a processor renders geometry of a given scene to generate a plurality of pixels of a geometry buffer, where any light sources in the given scene are ignored while rendering the geometry (block 805). Next, the processor performs a first pass on the plurality of pixels of the geometry buffer to identify a first portion of pixels which are in front of a front-side of a light volume, where the light volume is generated based on a light source (block 810).

For each pixel of the plurality of pixels of the geometry buffer, if the pixel is in front of the front-side of the light volume (conditional block 815, "yes" leg), a corresponding first pass discard indicator is set to a first value (block 820). If the pixel is behind the front-side of the light volume (conditional block 815, "no" leg), a corresponding first pass discard indicator is set to a second value (block 825). Then, the processor discards pixels which have a corresponding first pass discard indicator set to the first value (block 830).

Next, the processor initiates a second pass for only those pixels which have a corresponding first pass discard indicator set to the second value (block 835). In one implementation, the processor performs the second pass on a tile-by-tile basis for each tile of a plurality of tiles corresponding to a projection plane of the given scene. During the second pass, for each pixel, if the pixel is behind a back-side of the light volume (conditional block 840, "yes" leg), then the processor does not apply a lighting effect to the pixel (block 845). If the pixel is in front of the back-side of the light volume (conditional block 840, "no" leg), then the processor applies a lighting effect to the pixel (block 850). After blocks 845 and 850, method 800 ends. By performing the first pass followed by the second pass, fewer pixels are sent through the second pass, which reduces the overhead of processing pixels to apply the lighting effect.

Turning now to FIG. 9, one implementation of a method 900 for performing light volume rendering is shown. A processor renders geometry of a given scene while ignoring a light source to generate a plurality of pixels of a geometry buffer (block 905). It is assumed for the purposes of this discussion that the given scene has a single light source. It should be understood that this is representative of one particular implementation. In other implementations, scenes can have multiple light sources. Next, the processor generates a light volume based on the light source (block 910). Then, the processor performs a first pass on the plurality of pixels of the geometry buffer to identify a first portion of pixels which are in front of a front-side of the light volume (block 915).

Next, the processor performs a second pass on only a second portion of pixels of the geometry buffer which are behind the front-side of the first light volume (block 920). A result of the second pass is an identification of a third subset of pixels which are in front of a back-side of the light volume. It is noted that the first portion of pixels and the second portion of pixels are non-overlapping portions of pixels. It is also noted that the plurality of pixels of the geometry buffer consist of the first portion of pixels and the second portion of pixels. In other words, the first portion of pixels and the second portion of pixels make up the entirety of the plurality of pixels of the geometry buffer. Then, the processor shades, as a result of the second pass, pixels from the geometry buffer to represent the given scene (block 925). Next, the processor applies a lighting effect, corresponding to the light source, to a third portion of pixels, where the third portion of pixels are within the light volume (block 930). Then, the processor causes shaded versions of the pixels of the geometry buffer to be driven to a display to represent the given scene (block 935). After block 935, method 900 ends.

Figure 10:
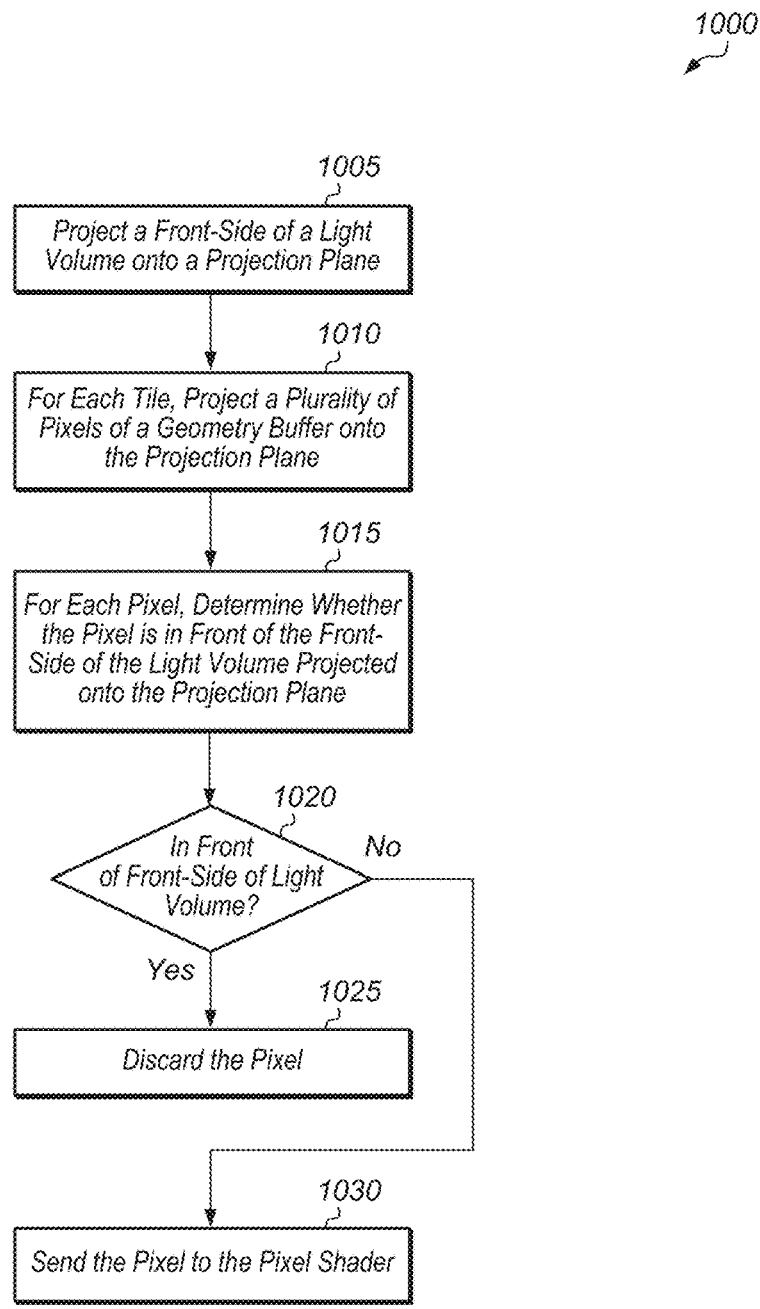
FIG. 10 is a generalized flow diagram illustrating one implementation of a method for projecting a front-side of a light volume onto a projection plane.

Turning now to FIG. 10, one implementation of a method 1000 for projecting a front-side of a light volume onto a projection plane is shown. An apparatus (e.g., processor, control logic) projects a front-side of a light volume onto a projection plane (e.g., projection plane 510 of FIG. 5) (block 1005). For each tile of a screen, the apparatus projects a plurality of pixels of a geometry buffer (e.g., geometry buffer 705 of FIG. 7) onto the projection plane (block 1010). For each pixel of the geometry buffer projected onto the projection plane, the apparatus determines whether the pixel is in front of the front-side of the light volume projected onto the projection plane (block 1015).

If the pixel is in front of the front-side of the light volume (conditional block 1020, "yes" leg), then the apparatus discards the pixel (block 1025). Otherwise, if the pixel is not in front of the front-side of the light volume (conditional block 1020, "no" leg), then the apparatus sends the pixel to the pixel shader (block 1030). The pixel shader can then process the pixel to determine if the pixel falls within the light volume, in which case a light shader will change the color of the pixel to represent a lighting effect caused by the corresponding light source. After blocks 1025 and 1030, method 1000 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
  a shader pipeline comprising one or more shaders; and
  control logic coupled to the shader pipeline, wherein the control logic comprises circuitry configured to:
    generate a light volume comprising at least a front-side and a back-side;
    in a first pass:
      identify, within a plurality of pixels of a scene geometry, a first portion of pixels which are in front of the front-side of a light volume;
      discard the first portion of pixels;
    in a second pass:
      identify, within the plurality of pixels of the scene geometry, a second portion of pixels which are behind the back-side of the light volume, without considering the first portion of pixels corresponding the scene geometry;
      discard the second portion of pixels;
    apply a shading effect to pixels of the scene geometry excluding pixels corresponding to the first portion of the scene geometry and the second portion of the scene geometry.

2. The apparatus as recited in claim 1, wherein the light volume is generated based on a first light source in the scene.

3. The apparatus as recited in claim 1, wherein the control logic is further configured to perform a depth text to determine the first portion of pixels are in front of the front-side of the light volume.

4. The apparatus as recited in claim 3, wherein the plurality of pixels comprise the first portion of pixels and the second portion of pixels, and wherein the first portion of pixels and the second portion of pixels are non-overlapping portions of pixels.

5. The apparatus as recited in claim 1, wherein the first portion of pixels that are in front of the front-side of the light volume are identified based in part on values of the front-side of the light volume projected onto a projection plane.

6. The apparatus as recited in claim 1, wherein the control logic is configured to disable depth buffer writes while performing the first pass.

7. The apparatus as recited in claim 6, wherein the control logic is configured to disable color buffer writes while performing the first pass.

8. A system comprising:
  a memory; and a processor coupled to the memory, wherein the processor is configured to:
  generate a light volume comprising at least a front-side and a back-side;
  in a first pass:
    identify, within a plurality of pixels of a scene geometry, a first portion of pixels which are in front of the front-side of a light volume;
    discard the first portion of pixels;
  in a second pass:
    identify, within the plurality of pixels of the scene geometry, a second portion of pixels which are behind the back-side of the light volume, without considering the first portion of pixels corresponding the scene geometry;
    discard the second portion of pixels;
  apply a shading effect to pixels of the scene geometry excluding pixels corresponding to the first portion of the scene geometry and the second portion of the scene geometry.

9. The system as recited in claim 8, wherein the light volume is generated based on a first light source in the scene.

10. The system as recited in claim 8, wherein the processor is further configured to perform a depth text to determine the first portion of pixels are in front of the front-side of the light volume.

11. The system as recited in claim 8, wherein the first portion of pixels that are in front of the front-side of the light volume are identified based in part on values of the front-side of the light volume projected onto a projection plane.

12. The system as recited in claim 8, wherein the plurality of pixels are generated by rendering geometry for the scene.

13. The system as recited in claim 8, wherein the processor is further configured to identify the first portion of pixels which are in front of both the front-side of the light volume and a front-side of a second light volume, wherein the second light volume is generated based on a second light source.

14. The system as recited in claim 8, wherein the plurality of pixels comprise the first portion of pixels and the second portion of pixels.

15. A method comprising:
  generating a light volume comprising at least a front-side and a back-side;
  in a first pass:
    identifying, within a plurality of pixels of a scene geometry, a first portion of pixels which are in front of the front-side of a light volume;
    discarding the first portion of pixels;
  in a second pass:
    identifying, within the plurality of pixels of the scene geometry, a second portion of pixels which are behind the back-side of the light volume, without considering pixels corresponding to the first portion of pixels of the scene geometry;
    discarding the second portion of pixels;
  applying a shading effect to pixels of the scene geometry excluding pixels corresponding to the first portion of the scene geometry and the second portion of the scene geometry.

16. The method as recited in claim 15, wherein the light volume is generated based on a first light source in the scene.

17. The method as recited in claim 15, further comprising performing a depth text to determine the first portion of pixels are in front of the front-side of the light volume.

18. The method as recited in claim 15, wherein the first portion of pixels that are in front of the front-side of the light volume are identified based in part on values of the front-side of the light volume projected onto a projection plane.

19. The method as recited in claim 15, further comprising storing the plurality of pixels in a geometry buffer.

20. The method as recited in claim 15, further comprising disabling depth buffer writes while performing the first pass.

\* \* \* \* \*